(12) United States Patent
Nagarajan

(10) Patent No.: US 9,454,059 B1
(45) Date of Patent: Sep. 27, 2016

(54) MZM LINEAR DRIVER FOR SILICON PHOTONICS

(71) Applicant: INPHI CORPORATION, Santa Clara, CA (US)

(72) Inventor: Radhakrishnan L. Nagarajan, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 154 days.

(21) Appl. No.: 14/472,193

(22) Filed: Aug. 28, 2014

(51) Int. Cl.
*G02F 1/225* (2006.01)
*G02F 1/025* (2006.01)
*G02F 1/21* (2006.01)
*G02F 1/015* (2006.01)

(52) U.S. Cl.
CPC ............. *G02F 1/2257* (2013.01); *G02F 1/025* (2013.01); *G02F 2001/0154* (2013.01); *G02F 2001/212* (2013.01)

(58) Field of Classification Search
None
See application file for complete search history.

(56) References Cited

U.S. PATENT DOCUMENTS

| | | | | |
|---|---|---|---|---|
| 5,359,449 A * | 10/1994 | Nishimoto | ............ | G02F 1/0123 359/245 |
| 2002/0071622 A1* | 6/2002 | Betts | ..................... | G02F 1/2257 385/2 |
| 2005/0254743 A1* | 11/2005 | Akiyama | ............... | B82Y 20/00 385/3 |
| 2014/0153859 A1* | 6/2014 | Akiyama | ............... | G02F 1/025 385/2 |
| 2014/0169723 A1* | 6/2014 | Kato | ....................... | G02F 1/011 385/3 |
| 2015/0249501 A1* | 9/2015 | Nagarajan | ............. | H04B 10/40 398/79 |
| 2015/0277158 A1* | 10/2015 | Akiyama | ............... | G02F 1/025 385/3 |

* cited by examiner

*Primary Examiner* — Mike Stahl
(74) *Attorney, Agent, or Firm* — Richard T. Ogawa; Ogawa P.C.

(57) ABSTRACT

The present invention includes a linear driver for Mach-Zehnder modulator (MZM) configured in a differential form with two waveguides carrying two traveling waves. Each waveguide comprises a MZM material configured with either a single segment in 3×MZM length or two split segments with one in 2×MZM length and another one in either 1× or 2×MZM length. By coupling a DC current source supplied with a modulation voltage with each segment thereof for providing electrical modulation signal overlapping with each of the two traveling waves. The modulated traveling waves in the two waveguides then are combined in one output signal by a multimode interference coupler. By properly choosing the configuration of MZM linear segments with optional length ratios, a low power consumption MZM linear driver provides either NRZ or PAM-4 modulation scheme to the input optical signals for telecommunication through silicon photonics.

29 Claims, 6 Drawing Sheets

MZM LINEAR DRIVER FOR SILICON PHOTONICS

CROSS-REFERENCE TO RELATED APPLICATIONS

This application is related to U.S. patent application Ser. No. 13/831,076, filed on Mar. 14, 2013, commonly assigned and fully incorporated as reference for all purposes.

BACKGROUND OF THE INVENTION

The present invention relates to telecommunication techniques. More particularly, the present invention provides an improved MZM linear driver for silicon photonics.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

40-Gbit/s and then 100-Gbit/s data rates over existing single-mode fiber is a target for the next generation of fiber-optic communication networks. The big hang up so far has been the fiber impairments like chromatic dispersion that are slowing the communication signal down. Everything is okay up to 10 Gbits/s plus a little, but beyond that, distortion and attenuation take their toll. Many approaches are proposed on modulation methods for transmitting two or more bits per symbol so that higher communication rates can be achieved. Mach-Zehnder modulators (MZM) can handle the higher data rates but require a driver that is differential with a wide output voltage swing.

But yet many problems as roadblocks for achieving high rate communication are associated with the MZM drivers such as RF loss limit of the traveling wave or amplitude limit of swing voltage. Therefore, improved techniques and methods are desired.

BRIEF SUMMARY OF THE INVENTION

The present invention relates to telecommunication techniques. More specifically, various embodiments of the present invention provide an improved Mach-Zehnder Modulator (MZM) linear driver for communication laser signal modulation in silicon photonics. In certain embodiments, the MZM linear driver is split to create two traveling wave segments with variable length ratio, which allows it working for 2-channel 4-level pulse-amplitude modulation (PAM).

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides a linear driver for Mach-Zehnder modulator (MZM) applicable for signal transmission through silicon photonics. The MZM linear driver includes a first MZM material having a first length overlapping with a first traveling wave and including a first electrode at a first end of the first length and a second electrode at a second end of the first length. The first traveling wave is split from an input optical signal by a directional splitter. The MZM linear driver further includes a second MZM material having a second length overlapping with a second traveling wave and including a third electrode at a first end of the second length and a fourth electrode at a second end of the second length. The second traveling wave is split from the input optical signal by the directional splitter. The second length is equal to the first length. Additionally, the MZM linear driver includes a DC coupled current source configured to couple between the first electrode and the third electrode to supply a modulation current flowing through respectively the first length and the second length driven by a modulation voltage coupled in-parallel the second electrode and the fourth electrode. The MZM linear driver further includes a middle electrode having a third length disposed in parallel to the first length and the second length and subjecting to a bias voltage effectively on a first p-n junction across the middle electrode and the whole first length and a second p-n junction across the middle electrode and the whole second length. In an alternative embodiment, the present invention provides a MZM linear driver with split 2-level segments applicable for signal transmission through silicon photonics. The MZM linear driver includes a first MZM material comprising a first segment of a first length and a second segment of a second length and overlapping with a first traveling wave split from an input optical signal by a directional splitter. Additionally, the MZM linear driver includes a second MZM material comprising a third segment of a third length and a fourth segment of a fourth length and overlapping with a second traveling wave split from the input optical signal by the directional splitter. The third length is equal to the first length and the fourth length is equal to the second length. Furthermore, the MZM linear driver includes a first DC coupled current source configured to couple with the first segment and the third segment to supply a first modulation current flowing through respectively the first length and the third length driven by a first modulation voltage and a second DC coupled current source configured to couple with the second segment and the fourth segment to supply a second modulation current flowing through respectively the second length and the fourth length driven by a second modulation voltage. Moreover, the MZM linear driver includes a middle electrode having a fifth length disposed in parallel to both the first MZM material and the second MZM material and subjecting to a bias voltage effectively on a first p-n junction across the middle electrode and the first segment and the second segment and a second p-n junction across the middle electrode and the third segment and the fourth segment.

The present invention achieves these benefits and others in the context of known waveguide laser modulation technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
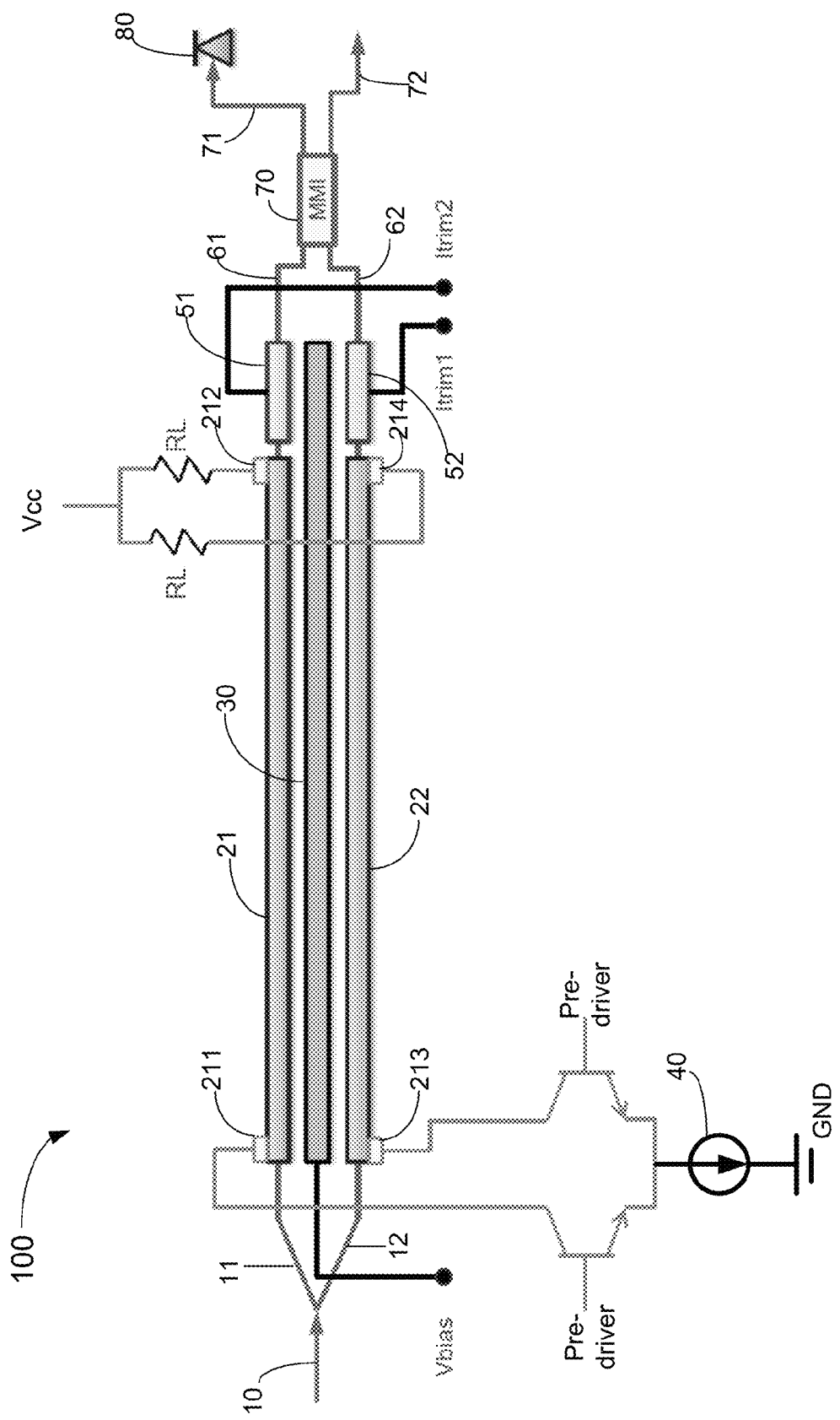
FIG. 1 is a simplified diagram of a standard configuration of a MZM linear driver with decoupled bias/current modulation according to an embodiment of the present invention.

The present invention relates to telecommunication techniques. More specifically, various embodiments of the present invention provide an improved Mach-Zehnder Modulator (MZM) linear driver for communication laser signal modulation in silicon photonics. In certain embodiments, the MZM linear driver is split to create two traveling wave segments with variable length ratio, which allows it working for 2-channel 4-level pulse-amplitude modulation (PAM).

In the last decades, with advent of cloud computing and data center, the needs for network servers have evolved. For example, the three-level configuration that have been used for a long time is no longer adequate or suitable, as distributed applications require flatter network architectures, where server virtualization that allows servers to operate in parallel. For example, multiple servers can be used together to perform a requested task. For multiple servers to work in parallel, it is often imperative for them to be share large amount of information among themselves quickly, as opposed to having data going back forth through multiple layers of network architecture (e.g., network switches, etc.).

Leaf-spine type of network architecture is provided to better allow servers to work in parallel and move data quickly among servers, offering high bandwidth and low latencies. Typically, a leaf-spine network architecture uses a top-of-rack switch that can directly access into server nodes and links back to a set of non-blocking spine switches that have enough bandwidth to allow for clusters of servers to be linked to one another and share large amount of data.

In a typical leaf-spine network today, gigabits of data are shared among servers. In certain network architectures, network servers on the same level have certain peer links for data sharing. Unfortunately, the bandwidth for this type of set up is often inadequate. It is to be appreciated that embodiments of the present invention utilizes PAM (e.g., PAM4, PAM8, PAM12, PAM16, etc.) in leaf-spine architecture that allows large amount (up terabytes of data at the spine level) of data to be transferred via optical network.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram of a standard configuration of MZM linear driver with decoupled bias/current modulation according to an embodiment of the present invention. As shown, an optical input signal 10 is launched into a first directional splitter. The power of the input laser signal 10 is split into the two optical paths 11 and 12 with a splitting ratio that can be adjustable. Signal waves carried in the two optical paths travel through two waveguides 21, 22 made by heavily n-doped silicon-based material with linear form factor over a buried oxide layer (not shown) under standard silicon CMOS technology. Along a middle region in parallel to the two waveguides, a heavily p-doped electrode 30 is laid to form two p-n junctions respectively throughout whole lengths of the two waveguides 21 and 22. Across one or both the p-n junctions, free carriers can be injected by applying an electric field to modify the refractive index in the waveguide material, i.e., the MZM material along the whole length of waveguide 21 or 22, and, thus, modify the phase/amplitude for the traveling wave through each path, forming a differential structure of the MZ modulator 100.

In an embodiment, both waveguides 21, 22 have two electrodes located at respective input end and output end coupled in parallel to a DC current source receiving a modulation electric field (called RF voltage or Vcc). For example, the first waveguide 21 has a first electrode 211 coupled to the DC current source 40 and the second electrode 212 receive Vcc voltage that drives a current flowing through the entire MZM material in the waveguide 21 with a current set by the DC current source and Vcc. Each current path is coupled with a resistor RL. Similar circuit is setup for the second waveguide 22. A DC bias voltage $V_{bias}$ is applied to the heavily n-doped middle electrode 30 (shared for two p-n junctions) to tune two respective "RF" electrical signals concentrated between the respective two electrodes of each waveguide, where "RF" electrical modulation signal interacts on the corresponding optical signal in each path with a "differential" structure associated with the two waveguides for producing modulation effect for the input signal. The two traveling waves are then combined into one fiber via a multimode interference (MMI) coupler 70 to yield a modulated output signal 72 due to the free-carrier injection-induced phase interference between the two traveling waves.

In addition to using $V_{bias}$ to tune (a minimum point of) modulator voltage, near the output end before the two traveling waves are combined, two thermo-optical controllers 51 and 52 are respectively inserted in the two optical paths for providing further operating point control on the transfer function of the above laser signal intensity modulation in terms of two control signal Itrim1 and Itrim2. It is mainly for compensating for the possible temperature related drift and for locking the device operating point so as to keep stable operation conditions.

In another embodiment, the splitting ratio associated with the directional splitter is designed to be about but not limited to 50:50. In particular, the splitting ratio may be designed to be something other than a strict 50:50 and this will reduce the extinction ratio and introduce a chirp in the spectrum of the optical signal in the two split paths. The chirp would be beneficial for transmission in fibers with the opposite sign for dispersion. For example, the directional splitter can be designed with the deliberate power offset in the arms (as much as 40:60) for introducing a chirp that is facilitating signal transmission.

In yet another embodiment, a low-percentage tap collects a small signal 71 for a photo detector 80 to check the output signal based on which one or more feedback control signals are generated for adjustment of the bias voltage, RF voltage, and modulation current (Imod) for achieving desire amplitude modulation for the input signal 10. This yields an electrical swing voltage between Vcc and Vcc-Imod×RL across the MZM length of each path, which varies with the MZM length, for modulating the input signal 10. Tuning Itrim1 and Itrim2 signals can be further used for stabilizing the operating point for the output signal 72. Tuning Itrim1 and Itrim2 also can be used for changing the power ratio of the input optical signal 10 into each path 11 or 12.

In still another embodiment, the MZM linear driver 100 is associated with a MZM length of (silicon-based) MZM material. In this application, it is denoted as 3X (X means a unit length, for example, mm), through which the applied "RF" electrical signal will be subjected a loss of power to the MZM material. Correspondingly, the MZM's 3X length determines a 3XdB RF loss for doing the required modulations on both paths so that the MZM driver 100 consumes 1X of power. In a specific embodiment, the MZM linear driver is implemented in telecommunication with a standard non-return-to-zero (NRZ) line code which is a binary code in which "1"s are represented by one significant condition (usually a positive voltage) and "0"s are represented by some other significant condition (usually a negative voltage), with no other neutral or rest condition.

Figure 2:
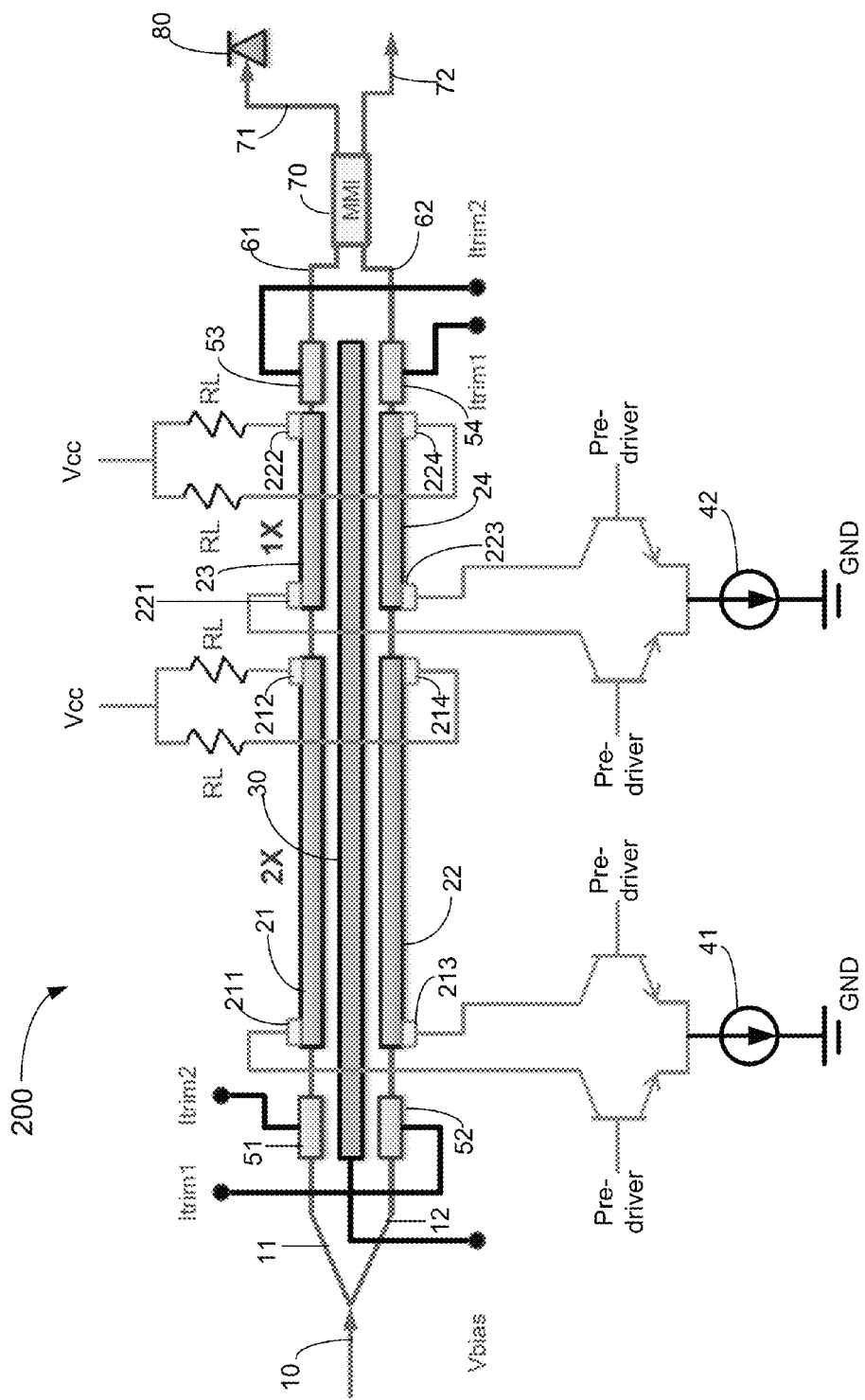
FIG. 2 is a simplified diagram of a preferred configuration of a MZM linear driver with split 2X+1X linear drivers according to an embodiment of the present invention.

FIG. 2 is a simplified diagram of a preferred configuration of a MZM linear driver with split 2X+1X linear drivers according to another embodiment of the present invention. As shown, a MZM linear driver 200 includes two split segments on each MZM arm for perform 4-level differential MZ modulation. Note, the MZM modulation can be implemented as pulse-amplitude modulation (PAM) as an alternative scheme compared to NRZ scheme shown in FIG. 1. Using the PAM scheme, the message information is encoded in the amplitude of a series of signal pulses. It is an analog pulse modulation scheme in which the amplitudes of a train of carrier pulses are varied according to the sample value of the message signal. FIG. 2 shows an implementation of a 4-level PAM-4 scheme.

Figure 2A:
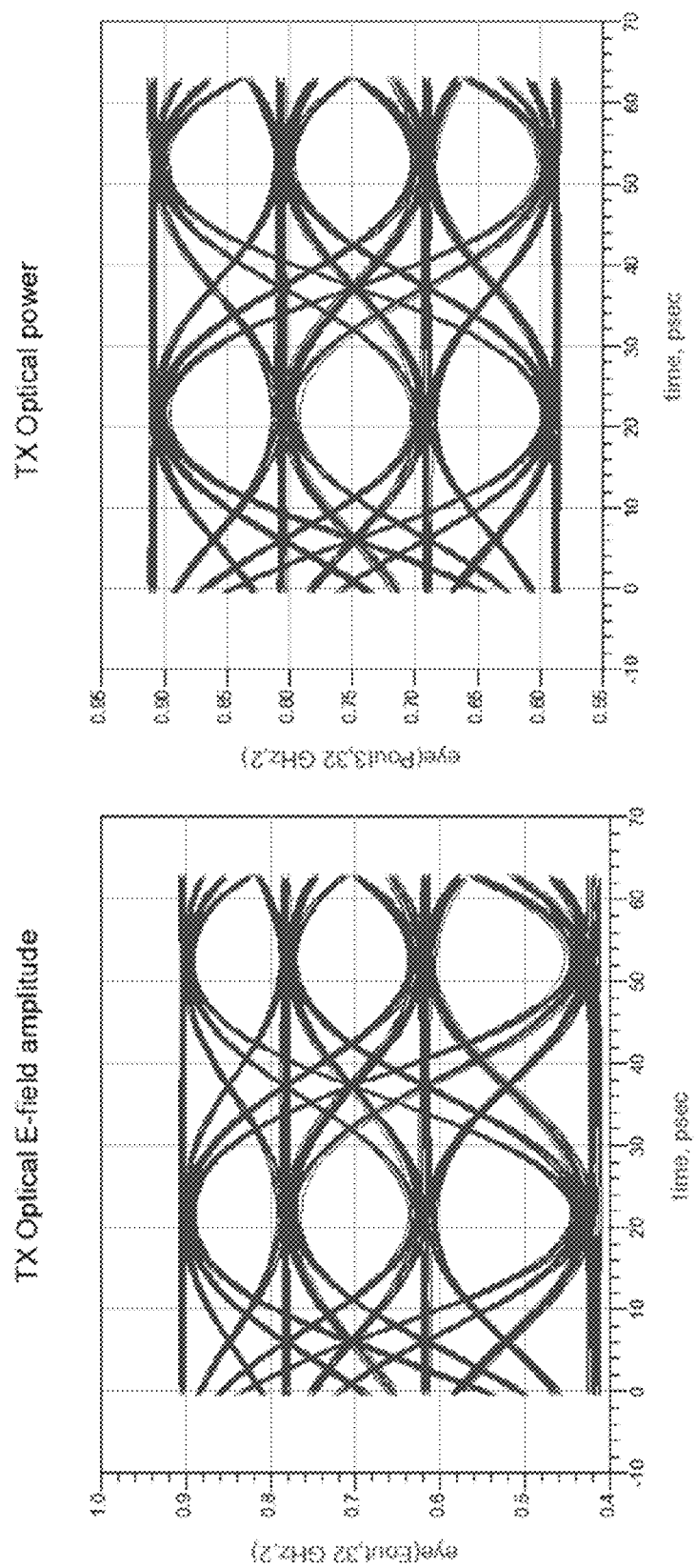
FIG. 2A is an exemplary of 3-levels of eye diagrams formed by combining 4 levels of amplitude modulation based on of a preferred configuration of the MZM linear driver with split 2X+1X linear drivers according to an embodiment of the present invention.

As shown in FIG. 2, a 3X length waveguide is divided into a 2X length segment 21 or 22 and a 1X length segment 23 or 24. Correspondingly, the 2X length segment 21 or 22 has 2X MZM length and the 1X length segment 23 or 24 has 1X MZM length. Each pair of either the 2X segment or 1X segment forms a 2-level differential linear driver. Each of the 2-level differential linear driver has its own DC-coupled modulation circuit which is substantially the same as one shown in FIG. 1, i.e., a DC current source (41 or 42) with supplied Vcc voltage (each with a resistor RL connected in series) coupled in parallel to each arm of the 2-level linear driver via two electrodes at both ends of each segment (with either 2X MZM length or 1X MZM length). Therefore, a 4-level pulse-amplitude modulation (PAM-4) scheme is implemented for such split MZM linear driver 200. PAM-4 scheme uses four distinct amplitude levels, each of which represents a combination of two bits ("00", "01", "11", "10") where each level is clocked on a rising or falling edge of a clock signal. The four levels combine to form three levels of eye diagrams, as shown in FIG. 2A. A diagram in the left-hand section of FIG. 2A shows an eye diagram for transmission optical E-field versus time (psec). Another diagram in the right-hand section of FIG. 2A shows a plot of output optical power in transmission versus time. As shown, four amplitude levels are corresponding respectively to bits of "11", "10", "01", and "00".

As shown in FIG. 2, as the input signal 10 is firstly divided by a 50/50 directional splitter into respective two optical paths 11, 12, the optical signal is a 2-bit/symbol data. The 2X segment is used for modulating either a MSB or LSB data bit of a 2 bits/symbol input signal and the 1X segment is used for modulating either a LSB or MSB data bit of the 2 bits/symbol input signal. After the respective modulation, modulated signals in two paths are combined again via a MMI coupler 70. A swing voltage that equals to Vcc-Imod×RL, needs to be adjusted to configure the MSB and LSB modulation respectively in two segments, here Vcc is the RF voltage, Imod is the modulation current supplied from the decoupled DC current source, and RL is a resistor associated with each modulation current path.

In an embodiment, the two 2X length segments couple with an electrical modulation circuit 41 (DC-coupled current source with RF voltage Vcc) via two respective electrodes 211/212, 213/214 at corresponding input/output ends on each waveguide 21 or 22. A first pair of thermo-optical controllers 51 and 52 is implemented near input end before the 2X MZM material for determining operation point of the first 2-level driver using a corresponding first set of Itrim1 and Itrim2 feedback control signals. The first set of Itrim1 and Itrim2 signals can also be used for tuning the splitting ratio of the directional splitter for dividing the input laser signal 10 into respective two paths 11 and 12. Similarly, the 1X length segment couples with its own electrical modulation circuit 42 via two respective electrodes 221/222, 223/224 at corresponding input/output ends on each waveguide 23 or 24. A second pair of thermo-optical controllers 53 and 54 with a corresponding second set of Itrim1 and Itrim2 feedback control signals is implemented near an output end of the second 2-level driver after the 1X MZM material. The second set of Itrim1 and Itrim2 signals can also be used for changing power ratio of two modulated optical signals 61 and 62 in the two respective paths that are combined into the output signal. The bias electrode 30 is shared by both the first and the second 2-level linear drivers extended through a full 3X MZM length to provide $V_{bias}$ voltage across p-n junctions associated with both the 2X segment and the 1X segment.

In accordance with the MZM material length associated with the two split segments in 2X length and 1X length, the RF loss are respectively 2XdB and 1XdB for providing phase/amplitude modulation to traveling waves in respective 2X segment and 1X segment. But the power consumed by each 2-level MZM linear driver is the same as 1X power in the 2-level MZM linear driver with 3X length shown before in FIG. 1. Therefore, total power consumed by the current MZM split 2X+1X linear drivers is 2X power. This is the price for achieving PAM-4 scheme by reconfiguring a 2-level differential MZM linear driver to a 4-level split differential MZM linear driver.

Figure 3:
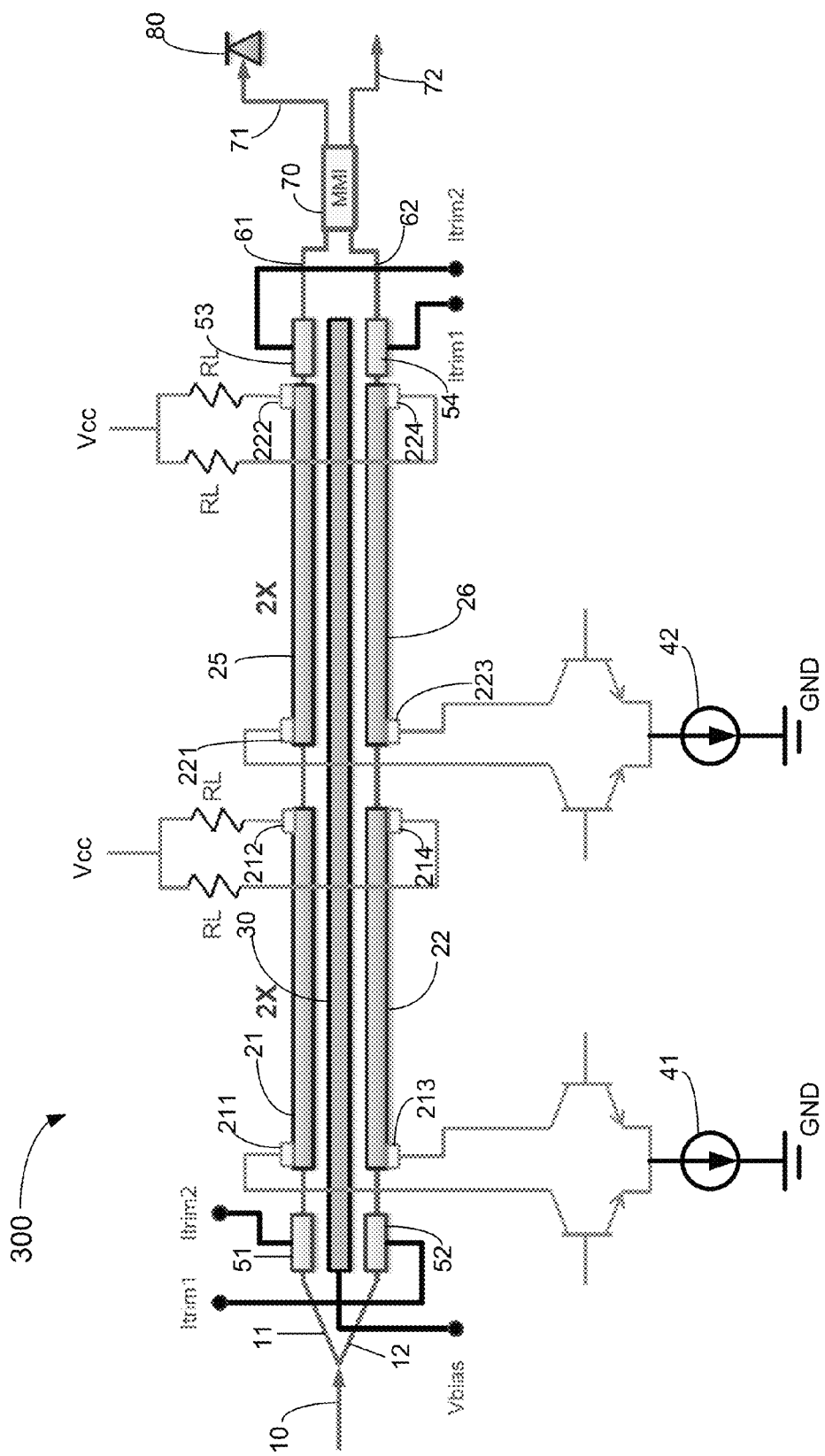
FIG. 3 is a simplified diagram of a preferred configuration of a MZM linear driver with split 2X+2X linear drivers according to another embodiment of the present invention.

In an alternative embodiment, the driver power consumption can be reduced via a trade-off with an increased MZM material length. FIG. 3 is a simplified diagram of a preferred configuration of MZM linear driver with split 2X+2X linear drivers according to another embodiment of the present invention. As shown, a MZM linear driver 300 includes two split segments on each MZM arm for perform 4-level differential MZ modulation. Each split segment comprises MZM material of a 2X length while leaving other electrical modulation circuit setup substantially the same as the MZM linear driver 200 with a 2X+1X split format (see FIG. 2). Correspondingly, each arm with a traveling wave creates two wave segments with a length ratio of 1:1. Each pair of 2X length segment forms a 2-level differential MZM linear driver so that a 4-level pulse-amplitude modulation (PAM-4) scheme is implemented by the MZM linear driver 300.

In a specific embodiment, both segments with 2X MZM length in each arm are configured for modulating either LSB and MSB bits in this configuration. For example, the second segment is part of a 2-level linear driver for modulating the LSB bits. Since the MZM length is increased from 1X length (FIG. 2) to 2X length (FIG. 3), RF loss associated with this segment with 2X MZM length is 2XdB. But the modulation phase is also doubled, then the swing voltage can be reduced by 50% for achieving same modulation effect for the LSB bits, resulting 50% reduction in driver power consumption. Therefore, the MZM linear driver 300 with 2X+2X split segments just consumes 1.5X total power under the same silicon CMOS technology.

Figure 4:
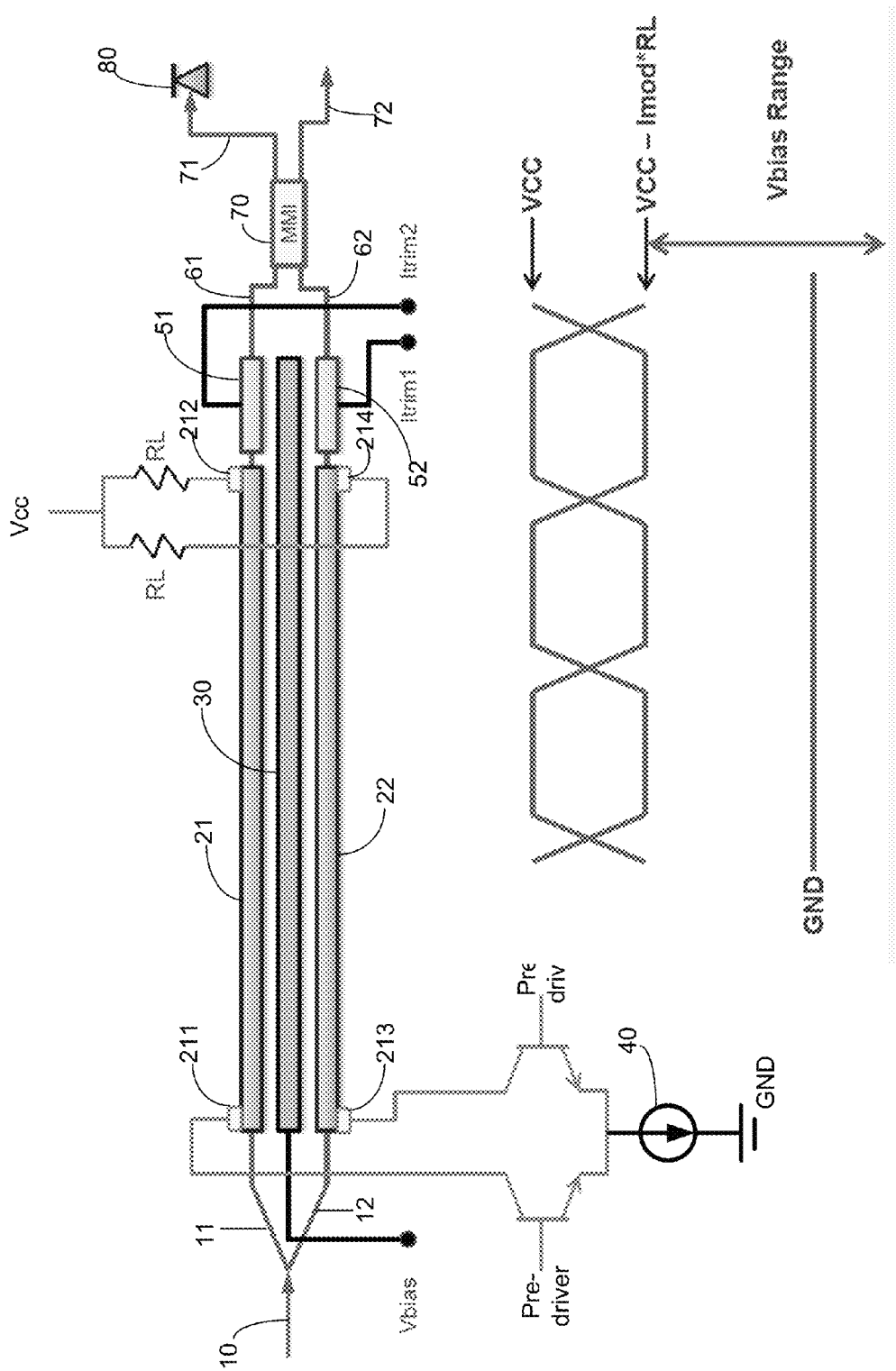
FIG. 4 is a simplified diagram of a drive configuration of the MZM linear driver with decoupled Vbias and GND according to an embodiment of the present invention.

FIG. 4 is a simplified diagram of a drive configuration of the MZM linear driver with decoupled $V_{bias}$ and GND according to an embodiment of the present invention. As shown, this is a DC coupled differential driver without bias tee and back termination. The DC current source is supplying modulation current Imod for RF electrical field in both paths overlapping with the optical signal in waveguides. In the implementation of the MZM linear driver to silicon photonics, the MZM path is made on top of SOI which is isolated from driver ground (GND). Since $V_{bias}$ and GND of the DC current source are decoupled, $V_{bias}$ must be set independently of the GND and may be higher or lower than the GND potential. The corresponding RF voltage for both paths is Vcc. The $V_{bias}$, applied in the middle electrode throughout both MZM waveguides, has an upper limit of (Vcc-Imod×RL). In other words, modulated swing voltage amplitude has a range between (Vcc-Imod×RL) and Vcc. Anything higher than that limit in $V_{bias}$ would forward bias to the MZM p-n junctions across the middle electrode and respective two arms of waveguides.

Figure 5:
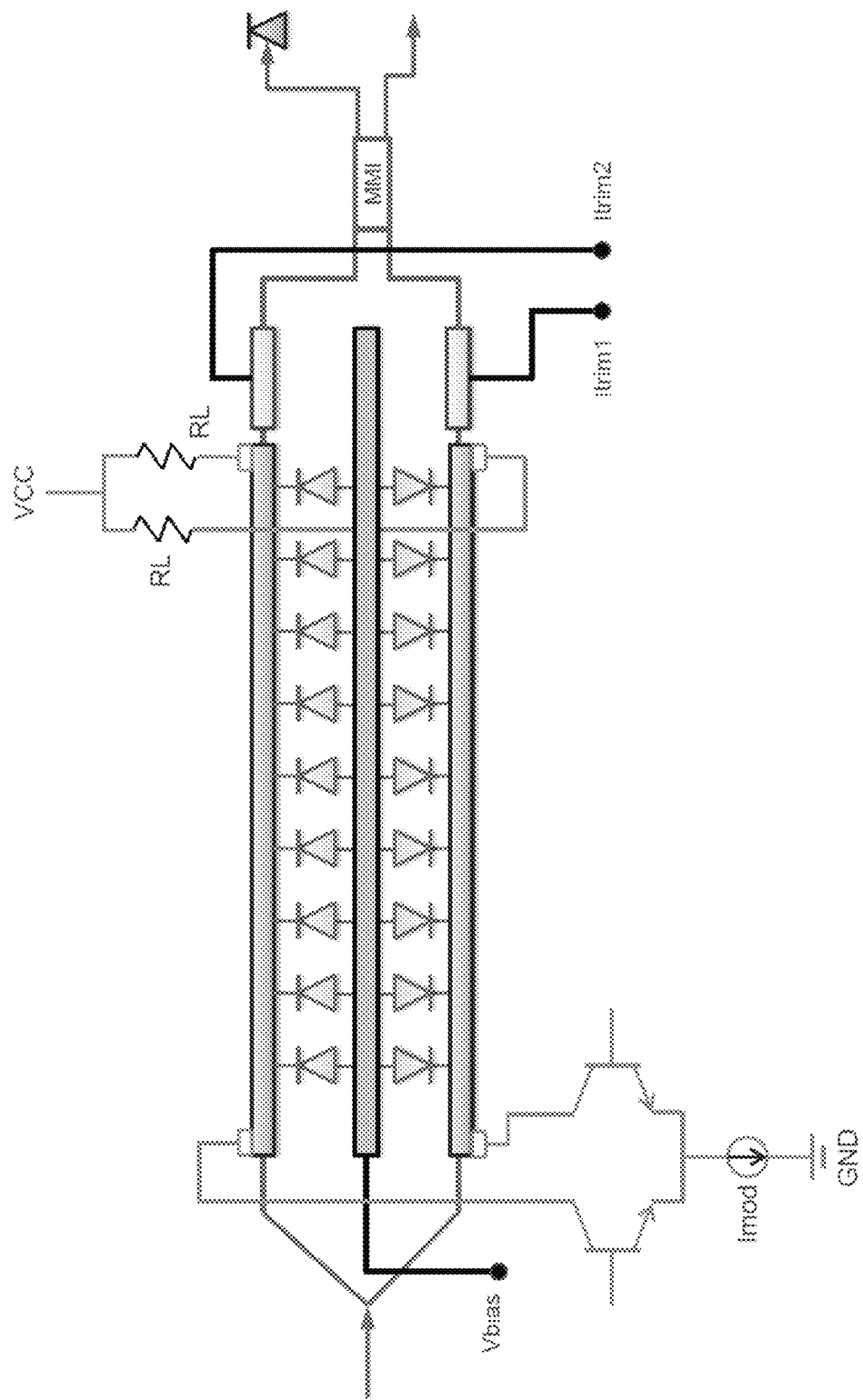
FIG. 5 is a simplified diagram of an electrical equivalent circuit of the MZM linear driver according to an embodiment of the present invention.

FIG. 5 is a simplified diagram of an electrical equivalent circuit of the MZM linear driver according to an embodiment of the present invention. As shown, the MZM linear driver essentially is a DC coupled differential optical driver with a Vbias applied in a middle electrode shared for both arms/paths of the traveling waves in silicon photonics waveguides. The middle electrode is heavily p-doped silicon-based material and two paths, serving as two arms for a MZM interferometer, are heavily n-doped silicon-based material. Electrically, this configuration is equivalent to a plurality of diodes laid throughout the MZM length of both arms/paths.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A linear driver for Mach-Zehnder modulator (MZM) applicable for signal transmission through silicon photonics, the MZM linear driver comprising:

A first MZM material having a first length overlapping with a first traveling wave and including a first electrode at a first end of the first length and a second electrode at a second end of the first length, the first traveling wave being split from an input optical signal by a directional splitter;

a second MZM material having a second length overlapping with a second traveling wave and including a third electrode at a first end of the second length and a fourth electrode at a second end of the second length, the second traveling wave being split from the input optical signal by the directional splitter, the second length being equal to the first length;

a DC coupled current source configured to couple between the first electrode and the third electrode to supply a modulation current flowing through respectively the first length and the second length driven by a modulation voltage coupled in-parallel the second electrode and the fourth electrode;

a middle electrode having a third length disposed in parallel to the first length and the second length and subjecting to a bias voltage effectively on a first p-n junction across the middle electrode and the whole first length and a second p-n junction across the middle electrode and the whole second length.

2. The MZM linear driver of claim 1 wherein the first MZM material and the second MZM material are substantially a same silicon-based material formed on a buried oxide layer in a SOI structure and doped with n-type electrical impurity.

3. The MZM linear driver of claim 1 wherein the middle electrode comprises a semiconductor material doped with p-type electrical impurity.

4. The MZM linear driver of claim 1 wherein the first MZM material with the first length and the second MZM material with the second length forms a differential Mach-Zehnder modulator to provide an amplitude modulation to the first traveling wave and the second traveling wave associated with the input optical signal in silicon photonics.

5. The MZM linear driver of claim 4 wherein the amplitude modulation is based on a format selected from a NRZ format or a PAM format.

6. The MZM linear driver of claim 5 wherein each of the first length and the second length corresponds to a 3×MZM length associated with 3×dBs modulation loss and 1× driver power consumption.

7. The MZM linear driver of claim 5 wherein the amplitude modulation comprises a swing voltage ranged between the modulation voltage and the modulation voltage minus the modulation current times a resistance associated with the first/second length of the first/second MZM material.

8. The MZM linear driver of claim 1 further comprising a pair of thermo-optical controllers located after the second end of each of the first MZM material and the second MZM material for setting operating point on a transfer function associated with each of the first traveling wave and the second traveling wave and tuning a splitting ratio of optical power between the first traveling wave and the second traveling wave for getting an power offset and a chirp during transmission.

9. The MZM linear driver of claim 1 further comprising a multimode interference (MMI) coupler to combine the first traveling wave and the second traveling wave after NRZ or PAM modulation.

10. The MZM linear driver of claim 1 wherein the DC coupled current source is configured to have an electrical ground decoupled from the bias voltage applied from the middle electrode.

11. The MZM linear driver of claim 1 wherein the first/second p-n junction is electrically equivalent to a first/second plurality of diodes connected in parallel between the middle electrode and the first/second MZM material and subjected to the bias voltage to set a minimum level of NRZ or PAM modulation.

12. The MZM linear driver of claim 1 wherein the third length is no smaller than either the first length or the second length.

13. The MZM linear driver of claim 1 comprising a low percentage tap coupler for checking output optical signal by a photodetector to generate feedback control signals.

14. The MZM linear driver of claim 1 wherein the directional splitter comprises a splitting ratio adjustable at least from 40:60 to 50:50.

15. A MZM linear driver with split 2-level segments applicable for signal transmission through silicon photonics, the MZM linear driver comprising:
A first MZM material comprising a first segment of a first length and a second segment of a second length and overlapping with a first traveling wave split from an input optical signal by a directional splitter;
a second MZM material comprising a third segment of a third length and a fourth segment of a fourth length and overlapping with a second traveling wave split from the input optical signal by the directional splitter, the third length being equal to the first length and the fourth length being equal to the second length;
a first DC coupled current source configured to couple with the first segment and the third segment to supply a first modulation current flowing through respectively the first length and the third length driven by a first modulation voltage;
a second DC coupled current source configured to couple with the second segment and the fourth segment to supply a second modulation current flowing through respectively the second length and the fourth length driven by a second modulation voltage;
a middle electrode having a fifth length disposed in parallel to both the first MZM material and the second MZM material and subjecting to a bias voltage effectively on a first p-n junction across the middle electrode and the first segment and the second segment and a second p-n junction across the middle electrode and the third segment and the fourth segment.

16. The MZM linear driver of claim 15 wherein the first MZM material and the second MZM material are substantially a same silicon-based material formed on a buried oxide layer in a SOI structure and doped with n-type electrical impurity.

17. The MZM linear driver of claim 15 wherein the middle electrode comprises a semiconductor material doped with p-type electrical impurity.

18. The MZM linear driver of claim 15 wherein the first MZM material associated with the first segment and the second segment and the second MZM material associated with the third segment and the fourth segment forms a 4-level differential Mach-Zehnder modulator to provide an amplitude modulation to the first traveling wave and the second traveling wave associated with the input optical signal in silicon photonics.

19. The MZM linear driver of claim 18 wherein the amplitude modulation is based on a PAM-4 format with the first/third segments for providing modulation to MSB bits and the second/fourth segments for providing modulation to LSB bits.

20. The MZM linear driver of claim 18 wherein each of the first length and the third length corresponds to a 2×MZM length associated with 2×dBs modulation loss and 1× driver power consumption and each of the second length and the fourth length corresponds to a 1×MZM length associated with 1×dBs modulation loss and 1× driver power consumption, assuming a same swing voltage over each of the first/third segment and each of the second/fourth segment.

21. The MZM linear driver of claim 18 wherein each of the first length and the third length corresponds to a 2×MZM length associated with 2×dBs modulation loss and 1× driver power consumption and each of the second length and the fourth length corresponds to a 2×MZM length associated with 2×dBs modulation loss and 0.5× driver power consumption, assuming a swing voltage over each of the second/fourth segment being dropped by 50% as modulation phase is doubled with each of the second length and the fourth length being increased from 1×MZM length to 2×MZM length.

22. The MZM linear driver of claim 20 wherein the swing voltage is ranged between the modulation voltage and the modulation voltage minus the modulation current times a resistance associated with the first/second length of the first/second MZM material.

23. The MZM linear driver of claim 15 further comprising a first pair of thermo-optical controllers located in front of the first segment and the third segment for setting operating point on a first transfer function associated with each of the first traveling wave in the first segment and the second traveling wave in the third segment and for tuning a splitting ratio of optical power between the first traveling wave in the first segment and the second traveling wave in the third segment for introducing an power offset and a chirp during transmission.

24. The MZM linear driver of claim 23 further comprising a second pair of thermo-optical controllers located after the second segment and the fourth segment for setting operating point on a second transfer function associated with each of the first traveling wave in the second segment and the second traveling wave in the fourth segment and for tuning a power ratio between the first traveling wave in the second segment and the second traveling wave in the fourth segment.

25. The MZM linear driver of claim 15 further comprising a multimode interference (MMI) coupler to combine the first traveling wave and the second traveling wave after a PAM-4 modulation.

26. The MZM linear driver of claim 15 wherein each of the first DC coupled current source and the second DC coupled current source is configured to have an electrical ground decoupled from the bias voltage applied from the middle electrode.

27. The MZM linear driver of claim 15 wherein the fifth length is no smaller than a sum of either the first length plus the second length or the third length plus the fourth length.

28. The MZM linear driver of claim 15 wherein the first/second p-n junction is electrically equivalent to a first/second plurality of diodes connected in parallel between the middle electrode and the first/second MZM material and subjected to the bias voltage to set a minimum level of a PAM-4 modulation.

29. The MZM linear driver of claim 15 wherein the directional splitter comprises a splitting ratio adjustable at least from 40:60 to 50:50.

* * * * *